April 17, 1934. G. A. M. LAMBLIN-PARENT 1,955,601
LIGHT PROJECTOR
Original Filed July 29, 1930  2 Sheets-Sheet 2
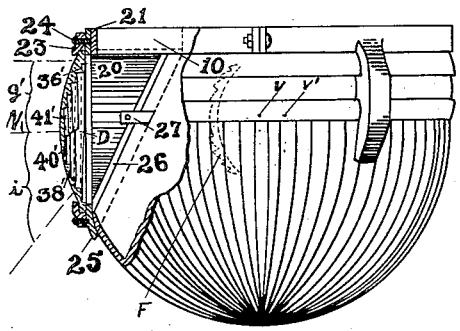
FIG. 8.
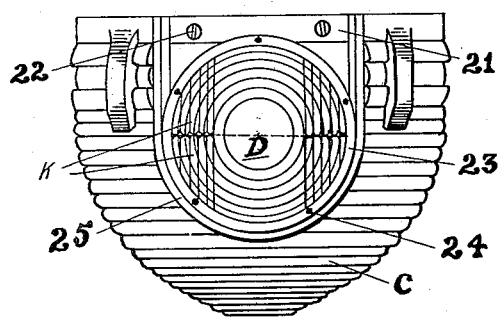
FIG. 13.
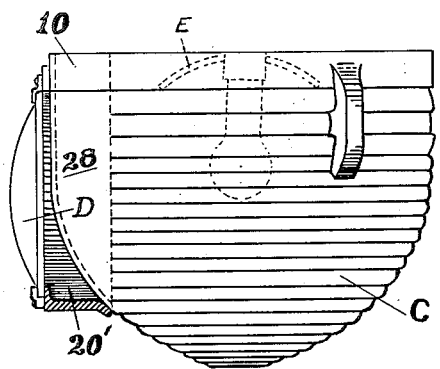
FIG. 14.
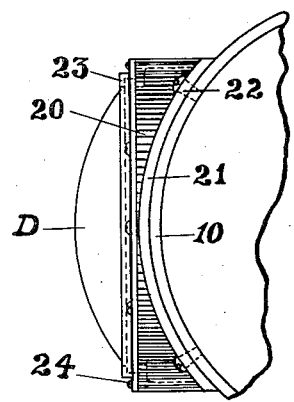
FIG. 9.
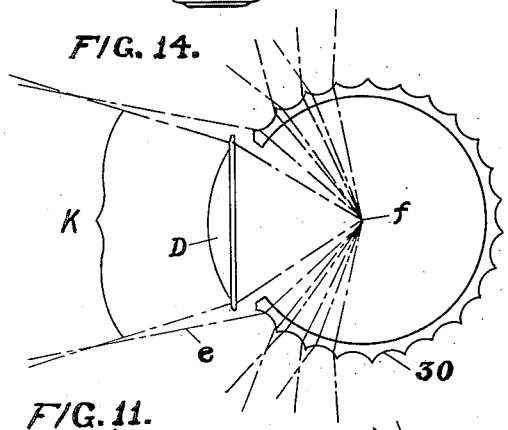
FIG. 11.
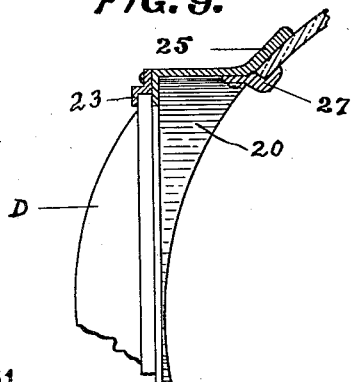
FIG. 10.
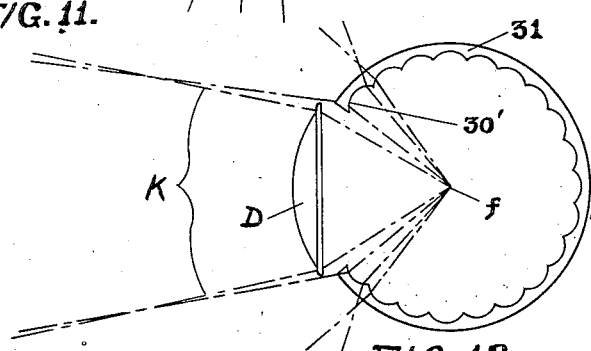
FIG. 12.
Inventor
GUSTAVE ALPHONSE MARIE LAMBLIN-PARENT
BY 
his Attorney Patented Apr. 17, 1934

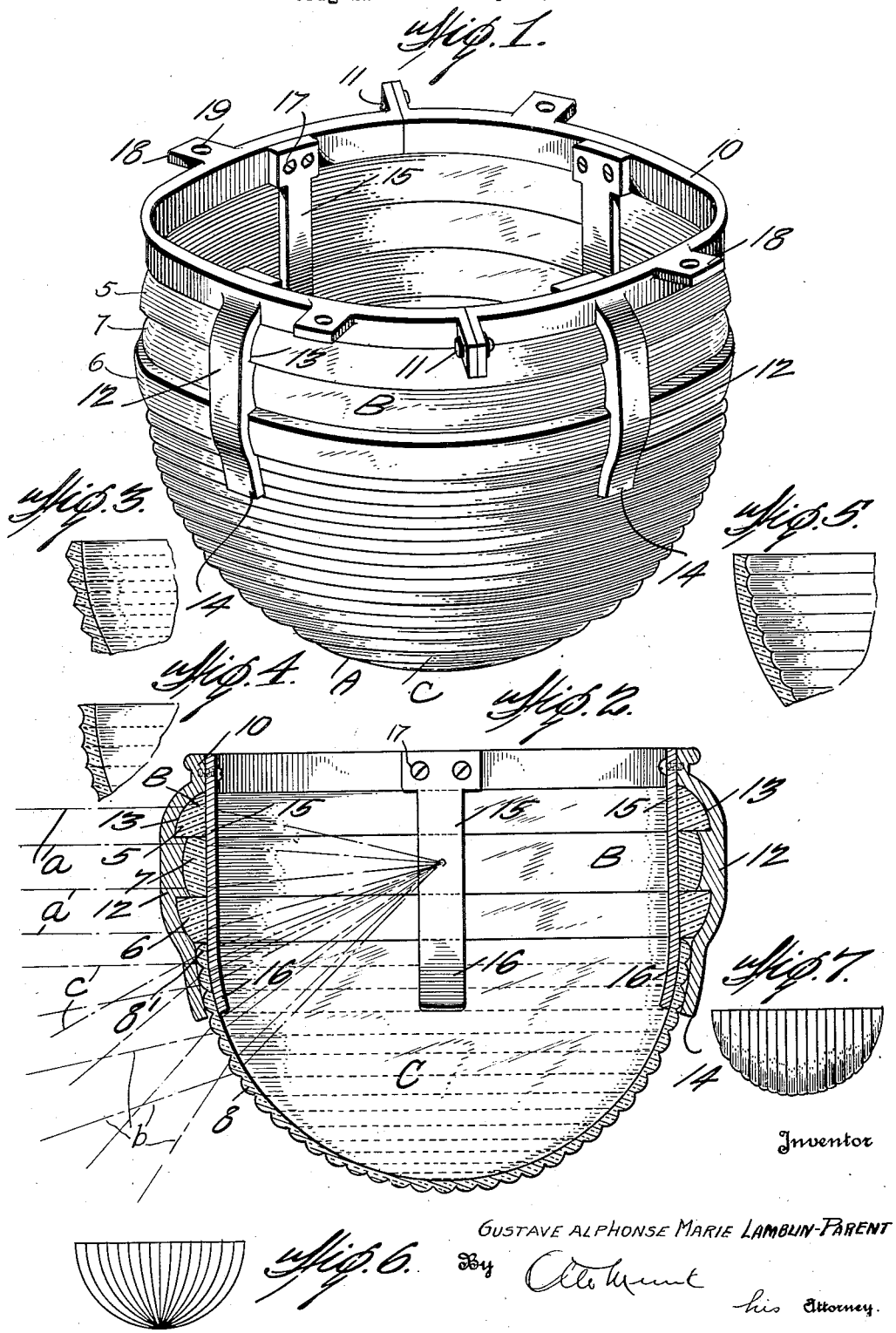

1,955,601

UNITED STATES PATENT OFFICE 1,955,601

LIGHT PROJECTOR

Gustave Alphonse Marie Lamblin-Parent, Ronchin, near Lille, France, assignor, by mesne assignments, to United States Holding Corporation, a corporation of Delaware Application July 29, 1930, Serial No. 471,468
Renewed August 19, 1933

22 Claims. (Cl. 240—7.7)

My present invention is for a wing light for aeroplanes adapted to be attached to the under side of the wing surfaces or fuselage of air craft, or at other desirable points, for illuminating the proposed landing area of the air craft at night.

While the invention is particularly suitable for use as a light for air craft, it will be understood that it will be found useful for other purposes such as the lighting of streets and highways and other areas.

One of the principal objects of the invention is to provide a light which is adapted to project a beam in the form of a hemisphere, the rays of which do not extend above the horizontal, the beam subtending an angle of approximately 180° measured vertically along any horizontal diameter of the light, the angle subtended by the beam measured horizontally being 360°. I thus provide a light which throws rays in all directions horizontally, and in all directions below the horizontal, and which, when used as an aviation light, illuminates obstacles and the landing area, both to the front, rear, sides and intermediate points, and also the area beneath the plane and extending up to the distant illumination.

Another object of the invention is to provide novel means for supporting the optical elements which go to make up the light, and for attaching the light to the air craft.

With these and other objects in view, which will become apparent as the description proceeds, the invention resides in the construction, combination and arrangement of parts hereinafter more fully described and claimed and illustrated in the accompanying drawings, which show various forms that the invention may take.

In the drawings,—

Figure 1 represents a view in perspective of one of the forms that the invention may take.

Figure 2 represents a vertical sectional view.

Figures 3 to 5 inclusive, illustrate fragmentary sectional views of the globular portion of the light, showing modifications of the arrangement of the refracting elements thereon.

Figures 6 and 7 illustrate elevational views of the globular portion showing modifications.

Figure 8 represents a view in elevation, partially in section, of a form of the invention in which the globular portion of the light is combined with a lens for forming a beam to be projected in combination with the hemisphere of rays projected by the globular portion.

Figure 9 represents a fragmentary plan view on a smaller scale, of Figure 8.

Figure 10 represents a fragmentary horizontal sectional view through the lens-holder.

Figure 11 represents a diagrammatic plan view of the form of the invention shown in Figure 8, illustrating the distribution of rays.

Figure 12 shows a diagrammatic plan view similar to Figure 11, and illustrating a different arrangement of refracting elements.

Figure 13 represents an elevational view looking toward the lens, the refracting elements being of the same type as shown in Figs. 1 and 2.

Figure 14 represents an elevational view partially in section of a form of the invention in which the lens is combined with the globular portion of the light, the zone of the latter intermediate the lens and light source being left free of refracting elements.

Referring more particularly to the drawings, the light A is in the general shape of a hemisphere, the upper portion B of which includes the horizontally arranged annular elements 5, 6 and 7 that make up an annular Fresnel adapted to project into horizontal and parallel paths, rays originating from the focal region $f$, as indicated by the rays $a$.

The globular portion C of the light below these optical elements may be provided with refracting elements such as illustrated at 8, adapted to distribute the rays into numerous overlapping beams for causing an even distribution of the rays over the illuminated area, as indicated at $b$. The curvature of the elements 8 adjacent the lower portion of the Fresnel combination is such that rays projected through these elements and refracted thereby, will not extend above the horizontal, as indicated by the element 8' and the rays $c$. Such rays projected by the upper elements will, however, overlap those projected by the elements there-below to cause the even distribution as before mentioned, and the substantially horizontally projected rays of the upper elements merging with the horizontal rays projected by the Fresnel elements, forms a continuity of the light flux projected by the light, so that there are no breaks in the illuminated area.

The numerous refracting elements on the globular portion of the light may take the form of annular horizontally arranged cylindrical lenses whose edges lie in planes substantially parallel with the axis of the lens D, hereinafter referred to, as shown in Figure 13, or they may be of other desired form for securing the objects intended. For instance, they may be of angular shape, as indicated in Figure 3, or of concave shape, as illustrated in Figure 4. It may also be desirable to arrange these elements on the inside, rather than the outside surface, as indicated in Figure 5. I may also desire to arrange the refracting elements on the globular portion vertically of the same along great circles thereof, as illustrated in Figure 6, or along zones thereof, as indicated in Figure 7.

The Fresnel and globular portions of the light may all be molded in one piece, or these parts may be separately molded and assembled in making the light. The Fresnel elements also, may be molded separately from each other if desired, as shown in Figure 2, and assembled in making up the light. All of these arrangements adapt themselves to the metallic supporting means which I provide.

The latter includes the semi-rings 10, adapted to be detachably connected together, as at 11, in assembling the light, such semi-rings forming a complete ring which is arranged above the Fresnel portion B of the light. From this ring at suitable intervals, depend the arms 12 which are shaped on their inner sides as at 13 to conform to the curvatures of the elements 5, 6, and 7 of the Fresnel, and which below the Fresnel are extended down as at 14, and curved to conform to the curvature of the globular portion C of the light. Opposite the arms 12, and on the inside of the ring are arranged the depending fingers 15, which follow the contour of the glass on the inside of the light, and which are curved inwardly at their lower ends, as at 16, to take the curvature of the globular portion C. These fingers co-operate with the arms 12 in clamping the parts in position, so that the glass portions of the light are securely suspended from the ring 10. The fingers 15 are put on after the ring with its arms are assembled and fitted upon the elements of the light, and may be secured in place by screws or other suitable fastenings 17. The ring may also be provided with the outwardly extending lugs 18 provided with openings 19 for receiving fastenings whereby the light may be attached to the under side of the wing, or to other desired portion of the air craft.

The inturned lower ends of the depending arms and their co-operating fingers will support the dome portion of the light, should the latter be made separately from the Fresnel portion. In case of separate manufacture of these parts, a new dome could be assembled with the Fresnels, in case the original one became broken, and on the other hand new Fresnels could be assembled with the original dome portion. This can be done by removing the fingers 15, separating the halves of the ring, assembling the glass portions, and re-assembling the suspending means, including the fingers, thereon.

I may use in combination with the light herein described, a lens for projecting a beam of rays in combination with the hemisphere of rays projected by the globular portion. Such a lens is shown at D, and it may take the form of the lenses described in my application, Serial No. 414,749, or my application, Serial No. 413,361 or Serial No. 380,281. Preferably, such lens is in the general shape of a circular Fresnel, having on the upper half of its rear face a series of substantially semi-circular refracting zones 36', and on the lower half another series of substantially semi-circular refracting zones 38'; there being also a centrally located bull's eye 40'. The refracting zones and the part of the bull's eye in the upper half of the lens, and the zones and the part of the bull's eye in the lower half of the lens are separated along a line of abrupt shoulders indicated generally at 41', which extend substantially horizontally and diametrically of the lens across the zones and the bull's eye thereof. The zones of the upper and lower portions of the lens may have different focal regions, the focal length of the zones of the lower lens being the longer, and the light source may be arranged at one of these focal regions. The zones are so shaped that a beam composed of horizontal rays in its upper portion g', and with rays of increasing divergence away from the lens axis N in its lower portion i' will be projected. A fuller description of the lenses which may be used are found in said applications. The lens may have the vertical flutes K arranged on each side of its central portion to laterally spread the portions of the beam passing therethrough.

When the lens D is used, it is arranged preferably, so that one of its focal regions is located substantially at the focal region f (Fig. 11) of the globular portion C, of the wing light.

The lens may be mounted on a substantially cylindrical sleeve 20 having a flange 21 at its upper portion which fits on the outside of one of the ring sections 10 to be secured thereto by screws or other fastenings 22. The lens D fits against the forward portion of the sleeve and may be retained in place by a ring 23 fastened by screws 24, to the sleeve. The rear end of the sleeve toward the globular portion of the light, may be provided with a flange 25, to fit against the globular portion. The zone of the latter intermediate the lens D and the light source, may be cut away as at 26, so as not to modify the rays passing from the source to the lens, and clips 27 may be used to retain the sleeve 20 in place, in addition to its attachment to the ring 10, such clips being mounted on the sleeve and overlapping the edge of the cut away portion of the globe.

The lens may be mounted without cutting away any portion of the globe, as indicated in Figure 14. In this case, the sleeve may be attached as before, to the ring 10, and the refracting elements on the globe C may be terminated where such globe is engaged by the rear flanged end of the sleeve 20', the zone 28 of the globe behind the lens, being left without the refracting elements thereon, so that rays from the light source may reach the lens D, unmodified. It will be understood that if found desirable the lens may be used and mounted as described on the dome or globe C, without disturbing the refracting elements thereon, i. e., with such elements occurring between the lens and light source.

As shown in Figure 11, I may provide the outside of the dome C with the vertically extending cylindrical flutes 30 for spreading the rays into overlapping beams, the curvature of the flutes being preferably such that the rays e, projected through the flutes adjacent the lens D, will merge with or overlap the side portions of the beam k projected by the lens, as indicated in Figure 11, to provide for a continuity with the hemisphere of rays emitted by the dome shaped portion C of the beam projected by the lens.

Or, if desired, I may arrange flutes 30' on the inside of the globe, as indicated in Figure 12, with horizontally arranged refracting elements 31 on the outside. Such elements may take the form of those already described. It will also be understood that horizontally arranged refracting elements may be placed on the inside of the dome where the vertical fluting is arranged on the outside thereof.

While I have shown the lens D as being mounted on one side only of the dome, it will be understood that a duplicate mounting may be arranged at the opposite side thereof, or such other numbers of mountings may be placed at such positions around the dome as may be desired.

I may also make the wing lights and the various portions thereof of different colored glasses. For instance, the dome portion of the light on the right hand or starboard wing may be green, and that on the left or port wing, may be red.

I may use a reflector E, located above the light source, as indicated in dotted lines in Fig. 14, to project downwardly through the globular portion, upwardly extending rays which would otherwise be lost, to thus utilize the upwardly extending rays and add them to those passing through the globular portion directly from the light source.

Where the portion of the light flux to be formed into a beam is to be increased, I utilize a concave stepped condenser shown in dotted lines at F, in combination with the lens D. The condenser is provided with spherical stepped refracting zones on its outer face to gather or condense the rays passing through the condenser and project them onto the lens D. The focal region of the system formed by the upper half of the lens E and the condenser may be located for instance, at V, and the focal region or the system produced by the lower half of the lens and the condenser may be at V'. It is desirable to locate the light source substantially at the focal region V, to preserve the parallel characteristics, and hence the penetrating power, of the upper beam section g', but the light source may be located behind this region to converge the upper beam section and superimpose it on the section of the beam projected through the lower half of the lens. Where the condenser is used it is preferable to design the Fresnel elements and the refracting elements on the globular portion with a focal region at the position chosen for the light source, for instance, at the focal region of the system produced by the upper lens half and the condenser.

It will be found that the light distribution resulting from my invention can be put to various uses such as the illumination of streets and highways, fields, and other areas that it may be desired to illuminate.

The foregoing description has been given for purpose of illustration, and no undue limitations should be deduced therefrom, for I wish it to be understood that I do not desire to be limited to the exact details of the construction shown and described, for obvious modifications will occur to a person skilled in the art.

Having thus described my invention what I claim as new, and desire to secure by U. S. Letters Patent is:—

1. A light adapted to be attached to the under side of air craft wings comprising a horizontally arranged Fresnel section having refracting zones of curvature to project into parallelism rays originating from the focal region of the light, a dome-shaped section below the Fresnel section and contiguous thereto, and having thereon numerous refracting elements adapted to distribute the rays passing there-through into overlapping beams, a supporting ring having arms depending therefrom shaped to correspond to the curvatures of the Fresnel section of the light and the dome section thereof, and engaging such sections, and fingers carried by the ring and co-operating with the arms for clamping and supporting the sections of the light therebetween for suspending the light from the ring.

2. A light projector comprising an upper Fresnel section and a lower dome section, such sections being provided with refracting elements adapted to project into a semi-spherical flux, the rays originating from the focal region of the light, and suspending means comprising a ring having clamping elements depending therefrom, and engaging the said sections of the light on the inside and outside thereof, such clamping means conforming to the curvature of the refracting elements of the light.

3. A light projector comprising a substantially semi-spherical glass portion having refracting elements projecting therefrom, and a metallic supporting member having arms shaped to conform with the refracting elements and embracing the same, and means co-operating with the arms for suspending said glass section from the supporting member.

4. In a light projector, the combination of a substantially semi-spherical glass section having refracting elements extending therefrom, and a supporting ring comprising separable elements having arms depending therefrom and shaped to engage the refracting elements to suspend the glass section from the supporting ring when the sections of the latter are connected together.

5. In a light projector, the combination of a glass section having refracting elements thereon, and a metallic supporting member having portions engaging refracting elements on the glass section and recessed to conform with the shape thereof, and detachable clamping means co-operating with said members for suspending the glass section from the supporting member.

6. In a light projector, the combination of a substantially bowl-shaped refracting section having a focal region, a sleeve adapted to be secured in engagement with one side of said bowl-shaped section, and a lens carried by the sleeve and having its axis at an angle to the axis of the bowl-shaped section, and adapted to receive rays from the focal region to project into a beam a portion of the hemisphere of rays emitted by said bowl shaped section.

7. In a light projector, the combination of a glass refracting dome-shaped section having a focal region and adapted to be suspended in inverted position from the under side of an aircraft, a lens, means for mounting the lens on the side of the dome-shaped section in vertical position and in position to receive rays from said focal region to project into a horizontal beam a portion of the hemisphere of rays emitted by the dome-shaped section, said section being provided with flutes for spreading into overlapping beams, the rays emitted by the dome-shaped section, the curvature of the flutes adjacent the lens being such as to project rays passing therethrough into overlapping relationship with the beam projected by the lens.

8. In a light projector, the combination of a glass body having a focal region and having refracting elements adapted to project into a hemisphere rays originating from the focal region, a lens at one side of the glass body in substantially vertical position and in position to receive rays from the focal region, said lens having upper and lower refracting elements thereon of different focal regions and adapted to project into a substantially horizontal beam a portion of the rays emitted by the glass body.

9. In a light projector, the combination of a dome-shaped section having a focal region and having refracting elements adapted to project into a hemisphere rays originating from the focal region, a lens in position to receive rays from the focal region, said lens having refracting elements thereon adapted to project into a beam a portion of the rays emitted by the dome-shaped section, a zone of the dome-shaped section intermediate the lens and focal region being free of refracting elements.

10. In a light projector, the combination of a substantially dome-shaped section having refracting elements thereon, a lens having for its upper half a different focal region than for its lower half, and a condenser, the system formed by the upper half of the lens and the condenser having a shorter focal length than the system formed by the lower half of the lens and the condenser, the said refracting elements having a focal region substantially at the focal region of the upper half of the lens and the condenser.

11. In a light projector, the combination of an inverted glass ray-emitting dome-shaped section having a focal region, a lens in substantially vertical position and in position to receive rays from said focal region to project into a substantially horizontal beam a portion of the hemisphere of rays emitted by the dome-shaped section, said section being provided with vertically arranged flutes, the curvature of the flutes adjacent the lens being such as to project rays passing therethrough into overlapping relationship with the beam projected by the lens, said lens being provided with vertically extending flutes for spreading the portions of the beam passing therethrough.

12. In a light projector, the combination of a glass body having refracting elements thereon adapted to project into substantially a hemisphere of light rays from a light source positioned within said body, and a lens having an upper portion provided with refracting zones having a focal region and a lower portion provided with refracting zones having a focal region differing from the focal region of the upper portion, the said refracting elements having a focal region corresponding substantially with one of the focal regions of said lens.

13. In a light projector, the combination of a substantially bowl shaped glass light-refracting body having a focal region, and a lens arranged substantially at one side of the body in substantially vertical position and in position to receive rays from said focal region, said lens having an upper section and a lower section provided with refracting zones thereon, the zones of the upper section having a different focal region than the zones of the lower section, said lens adapted to project into a substantially horizontal and downwardly extending beam a portion of the rays emitted by the body.

14. In a light projector, the combination of a substantially bowl shaped glass body provided with refracting elements having a focal region, a lens arranged substantially at one side of the body in position to receive rays from said focal region, said lens being provided with one section having refracting elements provided with a focal region substantially coinciding with the focal region of said body, and having another section provided with refracting elements having a different focal region, the refracting elements of said body adjacent said lens being substantially of such curvature as to project rays passing therethrough into overlapping relationship with the beam projected by the said lens.

15. In a light projector the combination of a glass body having refracting elements thereon adapted to project into substantially a hemisphere of light rays from a light source positioned within said body, in combination with a modified Fresnel lens arranged to one side of the light source in substantially vertical position and having on its upper portion refracting zones of curvature to project substantially horizontal rays from the light source and having on its lower portion refracting zones of curvature adapted to project with increasing divergence rays from the light source, whereby a portion of the light flux from said light projector will be projected by said lens into a beam of substantially horizontal and diverging rays.

16. In combination a bowl glass light refracting body having a focal region and a modified Fresnel lens forming a part of the body and divided into upper and lower sections each formed with refracting zones, the zones of the upper section having a different focal region than the zones of the lower section.

17. In a light projector a substantially bowl shaped body having refracting elements, and a modified Fresnel lens forming a part of the body and divided into upper and lower sections, said sections provided with refracting zones of varying refractive power and being of different focal lengths and a light source positioned in the region of the foci of said lens.

18. In a light projector the combination of a glass body section having a focal region, a lens having upper and lower sections provided with refracting zones of varying curvature associated with said body section in position to receive light from said focal region and to project into a beam a portion of the hemisphere of light emitted by the body section, said body section being provided with refracting elements of curvature to project rays passing therethrough into overlapping relationship with the beam projected by the lens.

19. A light projector comprising a horizontally arranged annular Fresnel section having refracting zones of curvature to project into parallelism light rays originating from the focal region of the light, a body section below the Fresnel section and contiguous thereto and having thereon numerous refracting elements adapted to distribute the light passing therethrough into overlapping beams, and a modified Fresnel lens at the side of the body section positioned to receive rays from said focal region and project them into a substantially horizontal beam.

20. In a light projector the combination of a glass refracting body section having a focal region, a lens at the side of the body section in substantially vertical position and in position to receive rays from said focal region to project into a substantially horizontal beam a portion of the hemisphere of rays emitted by the body section, said section being provided with flutes for spreading into overlapping beams the rays emitted by the body section, the curvature of the flutes adjacent the lens being such as to project rays passing therethrough into overlapping relationship with the beam projected by the lens.

21. In combination, a hollow glass body adapted to project in directions around its circumference, light from a light source located within said body and a modified Fresnel lens disposed at one side of the body and divided into a plurality of sections each formed with refracting zones, the zones of one section being of different curvatures and differing in curvature from the zones of the other section.

22. In a light projector, a glass body provided with a lens of modified Fresnel construction having an optical axis, refracting zones on the upper and lower half of the lens being of differing curvature, in combination with refracting elements on the glass body whose edges lie in planes substantially parallel with the optical axis of said lens.

GUSTAVE ALPHONSE
MARIE LAMBLIN-PARENT.